United States Patent [19]

Tremblay et al.

[11] Patent Number: 4,653,845
[45] Date of Patent: Mar. 31, 1987

[54] FIBER OPTIC STAR COUPLER

[75] Inventors: Yves Tremblay, Nepean; Ian S. Few, Richmond; Romain Maciejko, Nepean, all of Canada; John D. Ralston, Ithaca, N.Y.

[73] Assignee: Northern Telecom Limited, Quebec, Canada

[21] Appl. No.: 611,478

[22] Filed: May 17, 1984

[30] Foreign Application Priority Data

Dec. 8, 1983 [CA] Canada ..................... 442857

[51] Int. Cl.$^4$ ............... G02B 6/20; G02B 6/28; G02B 6/40
[52] U.S. Cl. ............... 350/96.16; 350/96.15; 350/96.22; 350/96.31
[58] Field of Search ............ 350/96.15, 96.16, 96.22, 350/96.29, 96.30, 96.31, 96.20, 96.21

[56] References Cited

U.S. PATENT DOCUMENTS

| | | | |
|---|---|---|---|
| 3,492,058 | 1/1970 | Waldman | 350/96.18 |
| 3,700,900 | 10/1972 | Herleikson | 350/96.22 |
| 4,165,225 | 8/1979 | Auracher et al. | 350/96.15 |
| 4,193,661 | 3/1980 | d'Auria et al. | 350/96.16 |
| 4,360,248 | 11/1982 | Bickel et al. | 350/96.16 |
| 4,362,357 | 12/1982 | Storkmann et al. | 350/96.16 |
| 4,449,783 | 5/1984 | Witte | 350/96.16 |
| 4,484,794 | 11/1984 | Witte | 350/96.16 |
| 4,519,673 | 5/1985 | Hamilton | 350/96.15 |

OTHER PUBLICATIONS

Lynch, IBM Tech. Discl. Bull., vol. 13, No. 2, Jul. 1970, "Fiber Optic Connectors", pp. 533–534.

Primary Examiner—William L. Sikes
Assistant Examiner—Frank González
Attorney, Agent, or Firm—Stuart L. Wilkinson

[57] ABSTRACT

A fiber optic star coupler particularly for use in providing optical interconnects between circuit boards has a light mixer into which input and output fibers are inserted. The mixer has rectangular cross-section passage, an interior surface of which is highly reflecting. The mixer is long enough to promote a degree of internal reflection of light from any one of the input fibers sufficient that the corresponding light intensity reaching the output fibers is substantially uniform. In an optical interconnect arrangement, interconnection between circuit boards in a rack or cabinet is achieved by mounting light emitting and light receiving units on each board and leading fibers to which the units are fixed to the fiber optic star coupler so that light from the emitter units enters one end of the light mixer and fibers leading to the receiver units enter the opposed end of the light mixer. The fiber optic star coupler is substantially cheaper and more easily manufactured than known fiber optic star couplers using a polished glass slab as a light mixer.

13 Claims, 4 Drawing Figures

FIBER OPTIC STAR COUPLER

BACKGROUND OF THE INVENTION

This invention relates to a fiber optic star coupler and to an arrangement for interconnecting multiple circuit cards mounted in a rack or cabinet using such a coupler.

As recognized by Coyne, "Distributive Fiber Optic Couplers Using Rectangular Light Guides as Mixing Elements", *Proceedings of the 2nd International Fiber Optics and Communications Exposition,* 1979, a rectangular light guide provides a good implementation of a star coupler for interconnecting many terminals in a communications system. Using such a guide, nearly uniform intensity of light can be achieved over the area of the light guide output end. In addition, the rectangular geometry provides a configuration in which fibers can be arranged with low packing fraction loss. The light guide described by Coyne is a sandwich structure having a thick central layer of high refractive index core glass and at two opposed surfaces of the core glass, a thin layer of relatively low index cladding glass.

To make the outer surfaces of the glass block highly reflecting, they must be polished which is a time consuming operation. Moreover, using transparent cladding layers any light incident on the high index/low index interface at greater than the Brewster angle is lost from the star coupling block. The glass used in the construction of this star coupler must be of high quality to minimize light attenuation and to reduce the chance of long term refractive index change which would change the performance of the star coupling block.

SUMMARY OF THE INVENTION

According to one aspect of the invention there is provided a fiber optic star coupler comprising a light mixer having a polygonal section passage extending therethrough, the mixer having an interior reflecting surface and opposed open ends, a first group of fibers having ends packed in an array, the array located at one end of the mixer to launch light into the mixer, and a second group of fibers having ends packed in a second array, the second array located at the other end of the mixer to receive light from the mixer.

Preferably the passage cross-section is rectangular.

The reflecting surface can be a layer of metal such as gold deposited onto an underlying substrate such as glass. The star coupler can be constructed by fixing several individual platelets together to define the passage.

For optimal coupling, i.e. uniform intensity at the output fibers commensurate with a low insertion loss, the passage should have a length "a" and width of "b" where a/b is greater than five.

To fix the groups of fibers to the mixer, the coupler can have a fixing means comprising plastics moldings extending around and fixing together end parts of each array of fibers such that end surfaces of the fibers are exposed by the moldings, and a corresponding plastics molding extending around the light mixer, the moldings being interengagable to lock the light mixer and fiber arrays into a predetermined relative position. The exposed end surfaces of the fibers can be ground and polished to decrease insertion loss of the coupler.

The light mixer can be a section of a hollow rectangular plastics extrusion, the section of extrusion having a metal reflecting layer deposited on an interior surface thereof. Alternatively the light mixer can be made by butting together a plurality of grooved members, an interior surface of the grooves being made highly reflecting before such butting.

According to another aspect of the invention there is provided an optical interconnect arrangement for a circuit card rack, the arrangement comprising a series of circuit cards mounted in parallel in the rack, each of the cards having at least one optical transmitter and at least one optical receiver mounted thereon, the transmitter and receiver each having electrical contact means connected to at least one of a plurality of electrical leads deposited on the card, each of the optical transmitters and optical receivers having a respective optical fiber connected thereto, distal ends of respective fibers being connected to an optical star coupler as defined hereinbefore.

In such an optical interconnect arrangement, the fibers can be plastic step-index fibers of high numerical aperture. Each of the optical receivers can comprise a fiber optic termination, a photodetector, a receiver contact means electrically contacting a corresponding card contact means on its associated circuit card, and means for mounting the photodetector and the fiber optic termination so that the photodetector receives light from the fiber. Each of the optical transmitters can comprise a fiber termination, a light emitting device, a transmitter contact means for electrically contacting a corresponding card contact means on its associated circuit card, and means for mounting the transmitter contact means, the light emitting device and the fiber termination whereby the fiber receives light from the transmitter. The photodetector can be a PIN photodiode and the light emitting device can be a light emitting diode.

BRIEF DESCRIPTION OF THE DRAWINGS

Embodiments of the invention will now be described by way of example with reference to the accompanying drawings in which.

DESCRIPTION OF THE PREFERRED EMBODIMENT

Figure 1:
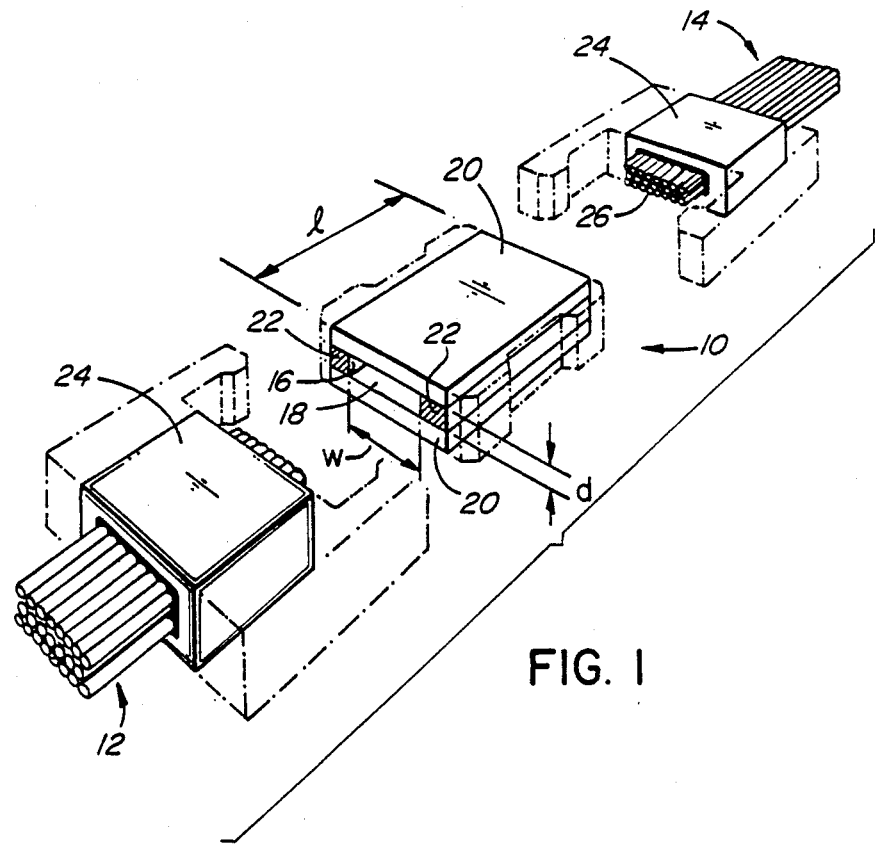
FIG. 1 is a perspective exploded view of a part of a star coupler according to the invention.

Referring in detail to FIG. 1 there is shown a fiber optic star coupler having a light mixer 10, and two bundles of fibers and 14 for insertion into opposite ends of the light mixer. The light mixer has interior reflecting surfaces 16.

When light is directed into the mixing guide from a fiber in the input fiber bundle 12, it undergoes multiple reflection from the light mixer surfaces 16 as it propagates down a passage 18 in the mixer. By the time the light reaches the far end of the light mixer it is evenly distributed over the area of the passage 18 so ensuring a uniform light input to all of the fibers of the output bundle 14.

The light mixer 10 has two opposed glass plates 20 which are spaced by aluminum spacers 22, the plate 20 and the spacers 22 defining the rectangular passage 18. The surfaces 16 of the plates and spacers facing into the passage are coated firstly with a 500 Å layer of chromium and then with a 1000 Å layer of gold. The gold coated glass has a reflectivity of 96.5% at a light wavelength of 820 nanometers, the underlayer of chromium functioning to increase gold film adhesion and durability. The glass is optically flat to λ/4 where λ is the wavelength of light used in the fiber optic system of which the star coupler forms a part. The length "l" of the light guide is 6 centimeters and the width and depth, "w" and "d" are respectfully, 8.6 millimeters and 2.85 millimeters.

The star coupler illustrated is dimensioned to provide light transmission from two 24-fiber arrays of step index plastic optical fiber. A prefered fiber is Dupont CROFON (registered trademark) fiber having an external diameter of 1 millimeter and a cladding thickness of 10 microns. 1 millimeter diameter, 0.5 numerical aperture Dupont CROFON fiber is well suited to use in the fiber optic star coupler since it is cheap and has high handling strength. The large diameter of the fiber reduces tolerances required on opto-mechanical interfaces such as detectors and sources and enables easy construction of input and output fiber bundles. Lastly the large ratio of core area to cladding area permits the use of a stacked non-planar array of fibers leading to a more compact bundle and ease of manufacture. As a less lossy alternative to CROFON fiber, large core plastic clad silica (PCS) having negligible attenuation over a few meters can be used.

Two bundles 12 and 14 of 24 fibers each are grouped together and have a plastics terminating block 24 molded around them such that the fiber ends project from the block. The fibers are packed closely in three rows of eight fibers each. The fiber end surfaces 26 are ground and polished after being fixed within the terminating blocks 24 to provide flat end surfaces projecting slightly from the surface of the blocks 24. The fiber ends can alternatively be prepared by cutting through the bundle of fibers after they are fixed within a plastic molding. Grinding and polishing gives the lower end loss of approximately 1 dB.

Figure 2:
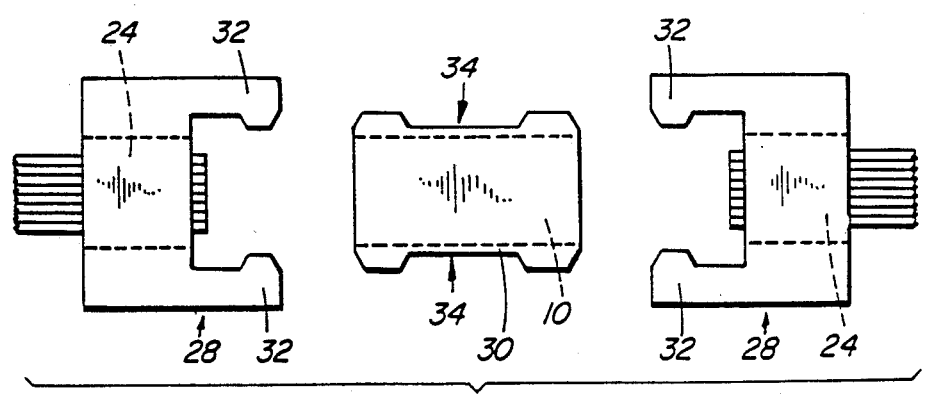
FIG. 2 is an exploded plan view of the FIG. 1 star coupler.

As shown in the plan view of FIG. 2, surrounding each of the terminating blocks is a molded plastics claw 28 which can be forced over a respective end of a molded plastics retension member 30. In use outer ends of fingers 32 locate within recesses 34 to obtain resilient engagement between the terminating blocks 24 and the light mixer 10 in a lock position. In use, the exposed ends of the clamped fibers automatically project into the open ends of the light mixer passage 18.

Light propagating into the light mixer 10 from one of the fibers in the input bundle 12 spreads out and is reflected from the mirror surfaces 16 of the inside of the light mixer. Through multiple reflection guaranteed by the length of the light mixer passage 18, the resulting light intensity at the output end of the mixer is quite uniform. The uniformity improves with passage length but, against this, light loss resulting from a multiple reflection increases. A mixing guide of length about 6 centimeters provides a good optimization. Practically then, any input from any one fiber of bundle 12 produces a near uniform output within the ouptut fibers of bundle 14 regardless of the output fiber position. The device is symmetrical so that any input or transmitter port can be used as an output or receiver port. The light mixer element, having a highly reflective polygonal passage, has a low light loss commensurate with a uniform distribution of light at the output fibers. Although the loss may be slightly greater than in conventional glass slab light mixers, the guide of the present invention can in comparison be manufactured easily and cheaply.

As an alternative to gold, an aluminum reflective coating can be vacuum deposited onto the interior surfaces of the light mixer. However the aluminum has a comparatively lower reflectivity of 89% and, in addition, does have a dip in reflectivity at 820 nanometers making it unsuitable for many commonly available light emitting diodes.

As an alternative to glass, plastic substrates may be used although plastics tend to be mechanically more unstable than glass and some plastics may emit gases over a period of time.

The light mixer shown in FIG. 1 is made by fixing together four separate components, each of which has been previously coated with a reflecting material. The mixer can alternatively be made as a hollow extrusion which is subsequently internally coated. In yet another alternative, the structure of the light mixer is made as two or more grooved extrusions which are butted and fixed along their edges after the grooved surface has been coated.

Although vacuum deposited layers provide a cheap and convenient method of forming a mirror inside surface, it will be appreciated that the light mixer can be formed in an underlying substrate by polishing the surface of the substrate. In such a structure a suitable substrate material such as stainless steel can be used. However, an advantage of using a vacuum deposited metal coating is that it tends to some extent at least to overcome any surface roughness in the underlying substrate.

Figure 3:
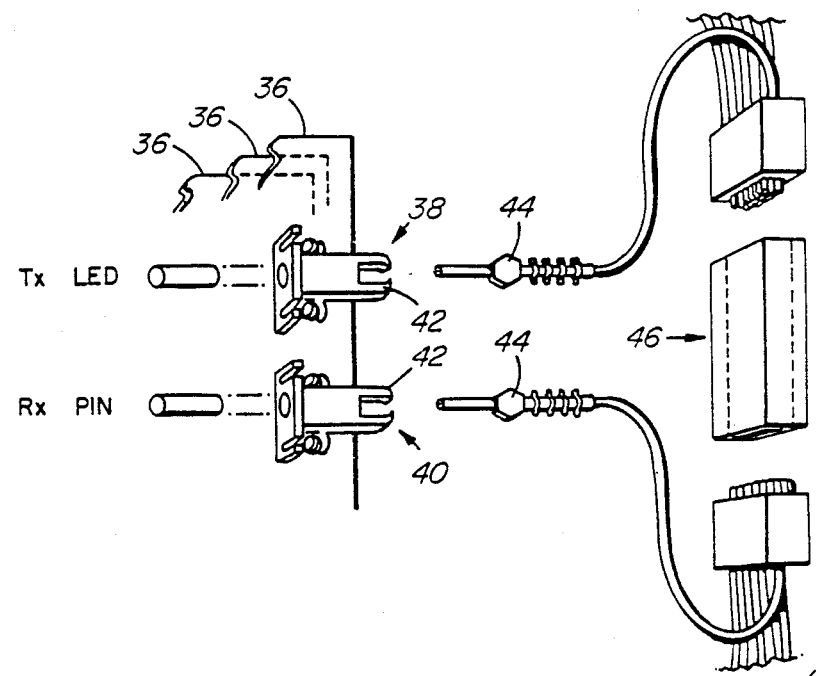
FIG. 3 shows the star coupler of FIG. 1 in an optical interconnect arrangement.

Referring to FIG. 3, the star coupler of FIG. 2 is shown in an optical interconnect arrangement intended as a substitute for the conventional back plane electrical interconnect arrangement. Particularly for computer and telecommunications related data nodes, a common mainframe configuration has a series of parallel printed circuit boards or cards 36. Data channels on any one of the cards have to be interconnected with data channels on all the other cards. The star coupler together with multiple input and output fibers and devices can be used to replace the conventional back plane usually used for such interconnection.

The circuit cards 36 each have a light emitting diode (not shown) and a PIN photodiode (not shown) which are mounted in respective connector units 38 and 40. Suitable diode packages are made by Amp Inc. under the trademark OPTIMATE DNP. Although not shown in the FIG. 3 embodiment, a dual plug assembly incorporating both a light emitting diode and a PIN photodiode can be mounted on the circuit card. These OPTIMATE units have a mechanical fixture having a claw 42 and a block 44 which can be inserted into the claw by springing the claw limbs apart and which is subsequently locked in position when the limbs return to their start positions. The block 44 forms part of a fiber termination. When the block and claw are interengaged, the fiber within the termination is appropriately placed either to receive light from the light emitting diode or to direct light towards the PIN photodiodes.

Figure 4:
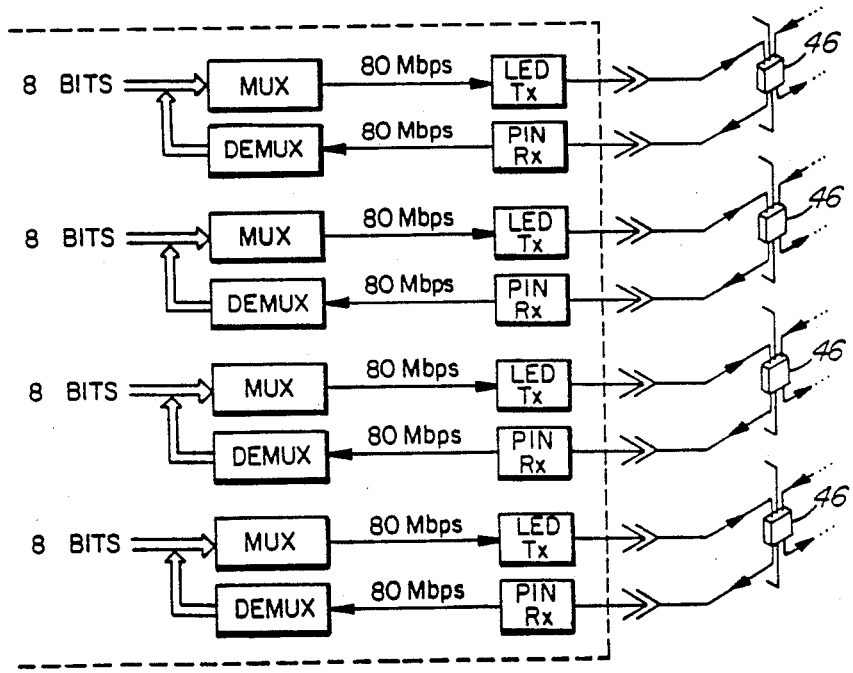
FIG. 4 shows diagrammatically one card of the FIG. 3 interconnect arrangement.

A typical arrangement for a telecommunications card back plane arrangement is shown schematically in FIG. 4. In operation, each card 36 carries 32 parallel lines with a line rate of 10 megabits per second. These parallel lines are multiplexed into a single optical channel operating at 80 megabits per second giving a total of four optical channels per card. Each 80 megabits per second stream drives a light emitting diode placed inside the Amp OPTIMATE unit 38 attached onto the printed circuit board 36, the PIN photodetector being mounted in a corresponding unit 40. An optical interconnect for the 24 cards each carrying 32 parallel lines at a line rate of 10 megabits per second has four optical star couplers 46 of the type shown in FIG. 2. The number of fibers in the star coupler at both the input and the output is the same as the number of cards or the necessary input and output ports on those cards.

An approximate insertion loss of the connector for a 1 millimeter plastic fiber is 1.7 dB. The low total insertion loss of the star coupler permits the use of inexpensive opto-electronic components in interconnect arrangements for high bit rate systems. The small spread in insertion loss has the advantage of substantially relieving the necessity for large dynamic range in the light receiving device control circuits. The insertion loss can be minimized by minimizing the fiber span between the OPTIMATE units 38 and 40 and the star coupler 46.

The arrangement also obviates the need for an automatic gain control network associated with each of the receivers. Thus if a particular local transmitter has a low output, this is monitored at each of the remote receivers. The remote transmitters then inform the local receiver of the low output and the local transmitter is then driven higher.

What is claimed is:

1. A fiber optic star coupler comprising a light mixer having a polygonal section hollow passage extending therethrough, the passage having highly reflecting interior bounding surfaces and opposed open ends, a first group of fibers having ends packed in an array, the array located at one end of the mixer to launch light into the passage, and a second group of fibers having ends packed in a second array, the second array located at the other end of the mixer to receive light from the passage.

2. A star coupler as claimed in claim 1 in which the passage cross-section is rectangular.

3. A star coupler as claimed in claim 1 in which each reflecting surface is formed by a layer of metal deposited onto an underlying substrate.

4. A star coupler as claimed in claim 3 in which each reflecting surface is formed by a layer of gold deposited onto a glass substrate.

5. A star coupler as claimed in claim 4 in which a chromium layer intermediate the gold layer and the glass substrate.

6. A star coupler as claimed in claim 1 in which the mixer has a passage of length "a" and width "b" where a/b is greater than five.

7. A star coupler as claimed in claim 1 in which the light mixer has a plastic molding around it, and the two groups of fibers have plastic moldings surrounding their arrayed ends but spaced from end surfaces of the fibers, the mixer molding and the fiber array moldings having interengaging formations whereby to lock the light mixer and the fiber arrays into a predetermined relative position.

8. A star coupler as claimed in claim 1 in which the interior reflecting surfaces are optically flat, to within $\lambda/4$ where $\lambda$ is a wavelength of light used in a system of which the star coupler forms part.

9. A star coupler as claimed in claim 1 in which the fiber end surfaces are ground and polished flat.

10. A star coupler as claimed in claim 1 in which the fibers are step-index plastic fibers.

11. A star coupler as claimed in claim 1 in which the light mixer forms part of an extrusion.

12. A star coupler as claimed in claim 11 in which the extrusion is rectangular.

13. A star coupler as claimed in claim 11 in which the light mixer comprises a plurality of grooved extrusions fixed to one another at edges thereof.

* * * * *